(12) United States Patent
Rosier

(10) Patent No.: US 9,692,654 B2
(45) Date of Patent: Jun. 27, 2017

(54) SYSTEMS AND METHODS FOR CORRELATING DERIVED METRICS FOR SYSTEM ACTIVITY

(71) Applicant: Benefitfocus.com, Inc., Charleston, SC (US)

(72) Inventor: Michael Rosier, Mt. Pleasant, SC (US)

(73) Assignee: Benefitfocus.com, Inc., Charleston, SC (US)

( * ) Notice: Subject to any disclaimer, the term of this patent is extended or adjusted under 35 U.S.C. 154(b) by 376 days.

(21) Appl. No.: 14/463,314

(22) Filed: Aug. 19, 2014

(65) Prior Publication Data

US 2016/0057034 A1    Feb. 25, 2016

(51) Int. Cl.
  *G06F 15/173*  (2006.01)
  *H04L 12/24*  (2006.01)
  *H04L 12/26*  (2006.01)

(52) U.S. Cl.
  CPC ...... *H04L 41/0883* (2013.01); *H04L 41/0631* (2013.01); *H04L 41/22* (2013.01); *H04L 43/08* (2013.01); *H04L 43/045* (2013.01)

(58) Field of Classification Search
  CPC ..... H04L 43/045; H04L 43/062; H04L 43/08; H04L 43/0894; H04L 43/10; H04L 43/12; H04L 43/14
  See application file for complete search history.

(56) References Cited

U.S. PATENT DOCUMENTS

| | | | |
|---|---|---|---|
| 5,581,242 A | 12/1996 | Arita et al. | |
| 6,363,325 B1 | 3/2002 | Bates et al. | |
| 6,425,006 B1 | 7/2002 | Chari et al. | |
| 6,965,308 B2 | 11/2005 | Fukuda et al. | |
| 7,444,263 B2 * | 10/2008 | White | G06F 11/3409 703/21 |
| 7,752,301 B1 | 7/2010 | Maiocco et al. | |
| 7,844,419 B1 * | 11/2010 | Gurrieri | G06F 17/509 703/1 |

(Continued)

FOREIGN PATENT DOCUMENTS

WO    2008086507 A1    7/2008

OTHER PUBLICATIONS

International Search Report and Written Opinion for Serial No. PCT/US2015/045477 filed Aug. 17, 2015, and mailed from the International Searching Authority on Nov. 27, 2015, 16 pgs.

(Continued)

*Primary Examiner* — Suraj Joshi
*Assistant Examiner* — Ayele Woldemariam
(74) *Attorney, Agent, or Firm* — John R. Thompson; Stoel Rives LLP

(57) ABSTRACT

A system can correlate derived metrics for system activity to determine problems and recommend solutions. Using a hierarchy of derived metrics from a set of raw metrics, a system can identify a problem, correlate related metrics and determine a recommended solution. For example, raw metrics can be collected about computing resources. Analyzers can process the raw metrics and outputs from other analyzers to gather metrics that include metrics derived from other metrics. When a problem symptom is discovered, derived metrics (and other metrics) can be correlated with the symptom to help identify the problem. Using the correlated metrics, a system can recommend a solution to an identified problem.

12 Claims, 11 Drawing Sheets

(56) References Cited

U.S. PATENT DOCUMENTS

| | | | |
|---|---|---|---|
| 9,378,112 B2* | 6/2016 | Banerjee | G06F 11/3495 |
| 2006/0188011 A1* | 8/2006 | Goldszmidt | G06Q 10/04 |
| | | | 375/229 |
| 2008/0198759 A1 | 8/2008 | Harmel et al. | |
| 2010/0202299 A1* | 8/2010 | Strayer | H04L 63/1408 |
| | | | 370/252 |
| 2014/0379889 A1* | 12/2014 | Faraboschi | H04L 41/0823 |
| | | | 709/224 |

OTHER PUBLICATIONS

Christensen, Ben, "Introducing Hystrix for Resilience Engineering," The Netflix Tech Blog, Nov. 26, 2012, pp. 1-2, Web Accessed Aug. 28, 2014 <http://techblog.netflix.com/2012/11/hystrix.html>.
International Preliminary Report on Patentability for Application No. PCT/US2015/045477 filed Aug. 17, 2015, and mailed from the International Bureau on Mar. 2, 2017, 13 pgs.

\* cited by examiner

```
graph: new SystemActivityAnalysis.Graph("exceptions", "Exceptions", "line", "per minute", 6),
mergeStrategyAcrossSourceSystemswithinTheSameTimeSlice: SystemActivityAnalysis.AnalyzerMergeStrategy.add,
extractor: function (rawData) {
    return rawData["numSignificantExceptions"];
},
messageIfNoValue: "no exceptions"
}
```

FIG. 7

```
{
    graph: new SystemActivityAnalysis.Graph("percentOfTotalSqlExecutionTimeSpentOnLongRunningRequests", "Percent Time for Long SQL",
"line", "%", 100),
    mergeStrategyAcrossSourceSystemsWithinTheSameTimeSlice:
SystemActivityAnalysis.AnalyzerMergeStrategy.globalAnalysisDoesNotSplitBySourceSystem,
    isCurrentlyEnabled: false,
    extractor: function (timesliceIndex, previousValueBySourceSystem, previousPayloadBySourceSystem) {
        // ----------------------------------
        // this uses dependent analyzers....
        // ----------------------------------
        // all vs. long time analyzers
        var totalTimeAllAnalyzer = SystemActivityAnalysis.getAnalyzer("totalSqlExecutionTime");
        var totalTimeLongAnalyzer = SystemActivityAnalysis.getAnalyzer("totalLongRunningSqlExecutionTime");

// all vs. long count analyzers
        var totalCountAllAnalyzer = SystemActivityAnalysis.getAnalyzer("totalSqlStatements");
        var totalCountLongAnalyzer = SystemActivityAnalysis.getAnalyzer("longRunningSqlStatements");

// all vs. long time values
        var totalTimeAllSqlStatements = totalTimeAllAnalyzer.graph.points[timesliceIndex].value;
        var totalTimeLongSqlStatements = totalTimeLongAnalyzer.graph.points[timesliceIndex].value;

// all vs. long count values
        var totalCountAllSqlStatements = totalCountAllAnalyzer.graph.points[timesliceIndex].value;
        var totalCountLongSqlStatements = totalCountLongAnalyzer.graph.points[timesliceIndex].value;

if (totalTimeAllSqlStatements && totalCountAllSqlStatements) {
        if (totalTimeLongSqlStatements && totalCountLongSqlStatements) {
        return {
            value: totalTimeLongSqlStatements / totalTimeAllSqlStatements,
            message: "% of total SQL execution time with " + totalCountLongSqlStatements + " long statements across " +
totalCountAllSqlStatements + " statements<br/>" +
"(" + SystemActivityAnalysis.prettyNumber(totalTimeLongSqlStatements) + " long statement time in total statement time: " +
SystemActivityAnalysis.prettyNumber(totalTimeAllSqlStatements) + ")<br/>" +
"(" + SystemActivityAnalysis.prettyNumber(totalCountLongSqlStatements / totalCountAllSqlStatements * 100) + "% of statement count)"
        },
        },
        messageIfNoValue: "no long sql statement info"
    },
},
```

FIG. 8

SYSTEMS AND METHODS FOR CORRELATING DERIVED METRICS FOR SYSTEM ACTIVITY

TECHNICAL FIELD

The present disclosure relates to computer system and network monitoring and analysis.

BRIEF DESCRIPTION OF THE DRAWINGS

FIG. 7 is a snippet of code illustrating operation of a raw data analyzer consistent with embodiments disclosed herein.

FIG. 8 is a snippet of code illustrating operation of a derived data analyzer consistent with embodiments disclosed herein.

DETAILED DESCRIPTION OF PREFERRED EMBODIMENTS

Figure 1:
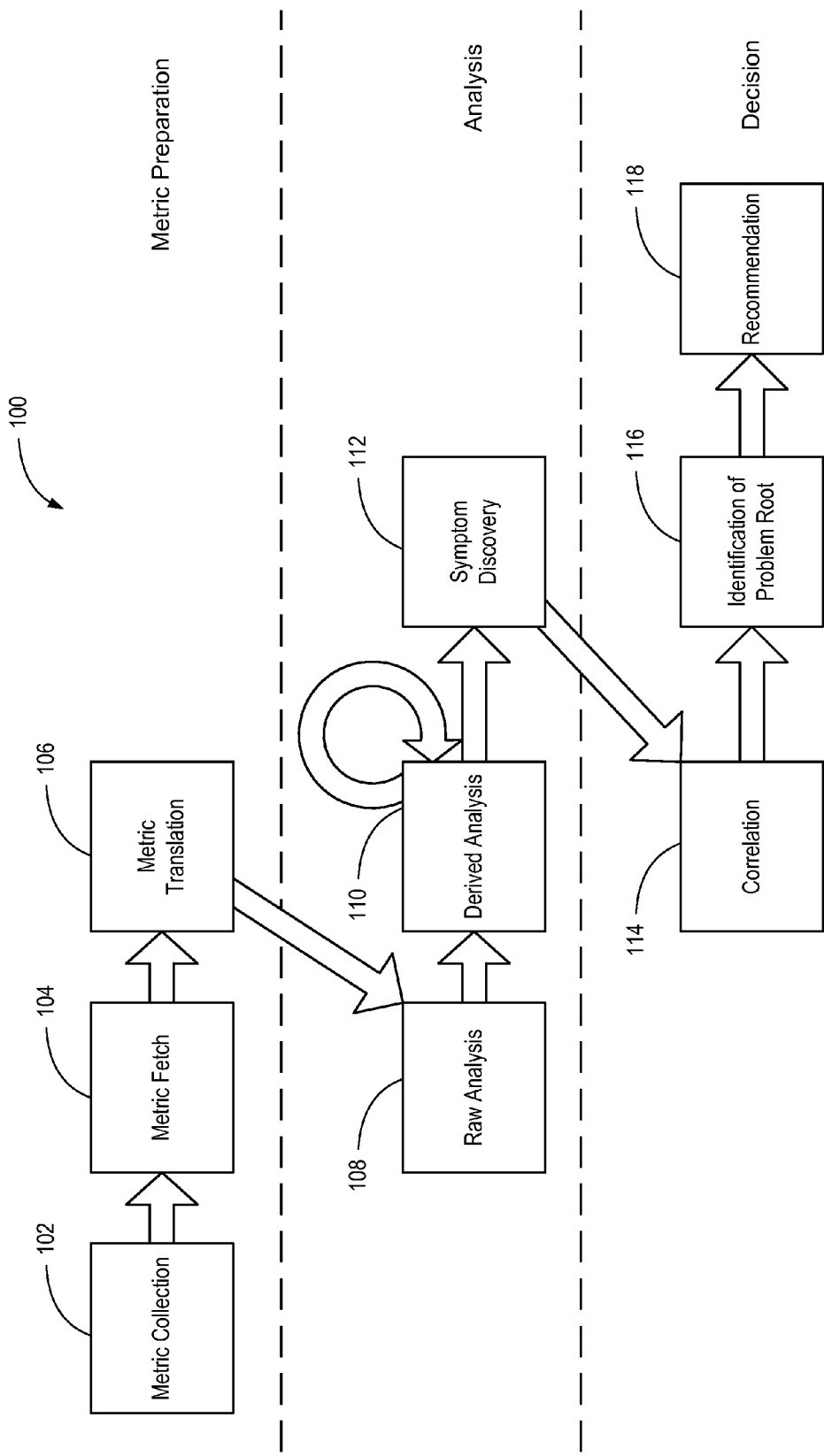
FIG. 1 is a flow chart illustrating decision flow for correlating derived metrics for system activity consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable correlating derived metrics for system activity. Using a hierarchy of derived metrics from a set of raw metrics, a system can identify a problem, correlate related metrics and determine a recommended solution. For example, raw metrics can be collected about computing resources. Analyzers can process the raw metrics and outputs from other analyzers to gather metrics that include metrics derived from other metrics. When a problem is discovered, derived metrics (and other metrics) can be correlated with the problem. Using the correlated metrics, a system can recommend a solution.

For example, a data center includes computing resources that track statistics about operation of the computing resources. A desktop computer accesses an intranet website in a browser that includes a dashboard constructed using analyzers, a correlation engine and a recommendation engine. Initial analyzers (analyzers lower in the analyzer hierarchy) can contact computing resources (e.g., database, logging server, load balancer, app server, control servers, etc.) and prepare outputs available to other analyzers and output for display. One initial analyzer is a memory usage analyzer that indicates a reporting system has a high memory usage. Another initial analyzer can include users logged into a reporting system. Yet another initial analyzer can include processes assigned to users. Another initial analyzer can include processes usage of memory.

Secondary analyzers (analyzers higher in the analyzer hierarchy) can take outputs from initial analyzers or other secondary analyzers. One secondary analyzer can take inputs of process memory usage and processes assigned to users and output users with high process memory usage. Another secondary analyzer can take inputs of users with high process memory usage and users logged into a reporting system.

A potential problem can be detected because a reporting system has high memory usage. Based on the detected problem, related metrics can be correlated with the high memory usage. Based on the correlated information, a user named vpfinance is logged into a reporting system that is taking most of the memory on one reporting process that appears to be approaching the database size itself.

In one example, the correlation can be performed by one or more analyzers in the analyzer hierarchy. Analyzers that perform correlation can provide correlated information as an output. The correlated information output can also be received as an input by one or more other analyzers in the analyzer hierarchy.

In some embodiments, analysis of derived metrics can be scheduled based at least in part on the detected problem or correlated information. For example, some derived metrics can have a computing cost that is substantial. Normally, these metrics are not computed.

Using that information, the system can have a solution that uses the correlated information to provide a recommendation. In this case, a reporting process that becomes the size of a database can be determined to be a rogue process. The recommendation can be to terminate the process and send a notification to the user to contact an information technology (IT) representative if the user wishes to run such large reports.

The system can then render an alert at a top of the dashboard presented to an administrator. The alert can include a highlighted problem metric with supporting metrics that describe the problem metric, which is separated and highlighted away from the rest of the dashboard. A solution to the problem can also be provided. By showing a problem, supporting data and a recommendation, an operator can take quick and decisive action. The operator can verify the important data and agree with the solution quickly, giving confidence in the recommended outcome. The operator can disagree with the recommended solution, but use the correlated information to make a quick decision in an alternative solution. The operator can also view the supporting data and disagree with the logical conclusion and instead review other metrics available below the alert for further research.

Related metrics can be determined in several ways. In some embodiments, related metrics can be based on derived metrics that exceed a threshold. In other embodiments, related metrics can be those that exceed a threshold. In some embodiments, metrics are pre-grouped into problem groups.

In one embodiment, analyzer scoring is used. As each analyzer is processed, the outputs (or sometimes intermediate internal values) can be compared against one or more thresholds. Based on the comparison, each analyzer can be scored. Analyzers that take inputs from outputs of analyzers lower in the analyzer hierarchy can inherit scores from analyzers from which inputs are received (e.g., sum, average, weighted average, decreasing historic weighted average, etc.). In some embodiments, correlation can be based on hierarchical relationships. In other embodiments, correlation can be based on scores.

In some embodiments dynamically evaluated systems can be used. For example, analyzers and engines can be created as JavaScript™ snippets that are evaluated and rendered dynamically. An administrator can create and add new analyzers, correlations and solutions that take outputs of other snippets as input. This can allow further explorations of problems that have been alerted, but are not satisfactorily described to the administrator. For example, the administrator in the prior description may not be able to tell whether the process is a rogue process or an intensive report. To solve this problem, the administrator can create an analyzer that takes current high memory usage jobs and compares them to historical usage of processes as described in logs. This can allow an administrator to decide whether to kill the process or transfer the process to a higher-cost server more capable of running the process without slowing down other users.

In large enterprise systems, a vast amount of operational data is generated that can mask important, but seemingly minor or unrelated, trends or data points. By dynamically grouping related monitors together and visually highlighting the comparative importance of concurrent issues, the system can highlight these trends and/or data points. Administrators may not need as much knowledge about or experience with the underlying system when diagnosing problems. In complex systems, even after the specific issue has been identified, a recommended action to resolve it may require expert awareness of environmental factors and detailed research into other aspects of the system. Systems and embodiments presented allow advanced (e.g., derived) analysis to include many factors relating to an issue and the overall system so that the alerts generated are actionable without expert human guidance.

For example, monitored systems periodically contribute payloads of various raw metrics. Individual metrics in these payloads can have quite diverse semantic meaning. Individual metrics may be point-in-time values (like current CPU usage), recent averages (like average CPU tracked since last contribution), or global counters (total CPU usage since startup). This diversity allows source systems to contribute various metrics in whatever way is most efficient for the given metric without having to perform any analysis (e.g., comparing the difference between a current global counter and the time it was previously recorded). The analysis can be applied later, and only raw values need to be recorded.

In the example, a web browser can receive metric payloads for the user-selected time frame (the default time frame is the most recent 30 minutes) from all systems that have contributed data during that time frame. The data is loaded from the centralized storage system. If an administrator is tracking current activity and not a specific historical time frame, the browser periodically requests new metrics that have been contributed since the last update. These update requests occur in the background and are sent at frequent intervals (typically every 30 seconds). These background requests can be disabled by the user, and can be disabled by default if the initial load time was dramatically longer than is typical (indicating the system is overloaded).

In the example, the browser can execute a series of analysis functions to identify aggregate values across all contributing systems for each minute in the given time frame. Each analysis function will typically apply some simple processing of each metric payload to identify the raw metric values relevant to that analysis function (for example, a single analysis function may extract both "used memory size" and "total memory size" in order to be able to identify a "used memory percentage." This first-level analysis is typically a simple calculation, but it can be very elaborate.

In the example, each analysis function will typically create a visual representation of the aggregate data it has accumulated across the contributing systems for each time slice within the overall time frame being analyzed. For example, one analyzer may show "average used memory percentage" as a bar graph where each bar is the average for all contributing systems for a single minute with the series of bars showing the changing values over the selected 30-minute time frame. Many analyzers will use a common visualization like a bar graph, but some will use more specialized visualization methods (for example, analysis of the major individual processes that have been running over a span of time might visualize those processes as a timeline to highlight the length of time they have been running, as well as to clearly show which significant processes were active concurrently or were starting/stopping at times that correspond to other potentially related metrics).

In the example, analysis functions (e.g., analyzers) have access to the results of other functions, and may use the results of functions that have already been evaluated to avoid duplication of effort. The administrator can highlight specific times on a graph and may optionally have the system highlight those markers on all other graphs. This allows an administrator to analyze the overall state of all the systems during a selected time range. As various analysis functions collaborate to progressively evolve the analysis done by previous analysis functions (providing more primitive data), these higher-level analysis functions (forming a hierarchy) are creating descriptive data.

In some embodiments, each analyzer can "score" the importance of the alerts it has identified. If there is only one "high score" alert identified, then the action item alert can be shown with strong emphasis on the main "screen" of the operations center. The combined analysis graph for the system needing assistance can be shown large (maybe 30% of the screen space) and the supporting graphs (memory, GC, CPU, and throughput) can be shown in an arrangement next to the combined analysis. These supporting graphs can take an additional 30% of the screen. Other analysis results can be available on secondary screens (or accessible by scrolling if looking at a single web page).

In one example, there are multiple "high score" alerts that relate to the same problem. A combined alert message can be shown that is similar to the single alert. A primary emphasis can be placed on the combined high-level analysis of the various systems experiencing the same issue, and the supporting graphs can focus on each individual system. This is in contrast to the single-alert scenario where the supporting graphs can allow a user to drill down to the various symptoms.

In another example, there are multiple "high score" alerts that relate to different kinds of problems. A display can split the available space between the highest-level analysis of each alert type. The supporting analysis graphs will still be available, but they can be on secondary screens (or accessible by scrolling if shown on a web page).

In one embodiment, an implementation of this system is browser-based and written in JavaScript™ and HTML. This implementation choice enables a user to create and modify highly customized analysis functions very rapidly, and to progressively build out new custom functionality and analysis and see the results of the changes interpreted live as the changes are edited without needing to have a more formal server-based analysis framework.

However, it should be recognized that this browser-based implementation is not the only possible implementation. For example, the systems described can be implemented with the analysis executed in a more server-oriented system. This implementation change can require more server resources and a different technical implementation. In some embodiments, this translates to an ability to process more data (avoiding the bandwidth and resource constraints of a traditionally less-equipped client system). A server-based system can have the analysis results hosted on a more stable centralized system and shared by multiple client systems. In an embodiment, some tasks can be more easily handled by a less-distributed system; for example, guarantees of constantly analyzing activity or sending email notifications from a centralized system can be significantly less resource intensive.

In one example, one analysis function is able to track used memory percentage. A later analyzer takes that data and tracks if there are any systems that have sustained high memory usage for a period of time. If the source systems are using managed memory systems, the amount of garbage collecting done by those systems will indicate if they are actually running out of memory, or if the high memory usage is stable. Another analyzer will track the percentage of time each system is spending on garbage collection. While each of these analysis results is valuable alone, the results alone may not be truly actionable without human monitoring and correlation of these individual results. However, this correlation can be addressed by the addition of an advanced analyzer that is able to build upon the memory usage data using the garbage collection data, the CPU usage, and the throughput of useful work. This advanced analyzer (which is higher in the analyzer hierarchy) can then detect a situation where there is high memory usage, high garbage collection, high CPU usage, and low throughput of useful work—the symptoms of a managed memory system that is out of memory and is not able to do useful work because it is spending all its time trying to free memory. Having correlated all these data points together, the advanced analyzer has a specific actionable alert that can be sent to the personnel who are able to address the specific problem (in this case, someone in the network operations center). Note that this "alert" is not simply a basic analysis of "high memory usage" (which may not be important), but rather it is a well-supported, specific alert that encourages action and provides quantified metrics that define importance (e.g. an importance value, severity value, etc.): "server ProdSrv137 is working at 12% expected throughput because it has been out of memory for 7 minutes."

The advanced analyzer described above was able to provide relevant details and quantified metrics that define importance. By layering on additional analyzers in the analyzer hierarchy (that have been customized by system experts with specific awareness of the tools available and the actions that should be taken to respond to particular alert conditions), the analyzers can now derive further useful information from the quantified alert information and provide a basis for an appropriate response to recommend to an operator receiving a quantified alert.

Continuing the above example, the system experts may have a defined process for how to dynamically allocate additional memory to a system that is clearly identified as out of memory (and a ratio of how much memory should be granted based on the importance of the alert). In this context, the actionable alert might state: "server ProdSrv137 should be granted 40% more memory for the next two hours." This level of analysis has been derived from a comparatively "raw" display of graphs of low-level system activity (requiring human experts to identify and correlate important events) into a solution with supporting evidence.

The analysis involved with identifying the specific action to take in response to an alert can involve many factors not directly related to event itself. For the "out of memory" example, such factors can include the amount of memory available to be granted, the overall activity of the systems not currently impacted by the memory stress, a ranking of probability that other systems would also soon be needing additional memory, and even the current market rates for expanding hosted resources. All of these metrics can be provided by lower-level analyzers from the analyzer hierarchy and can potentially be of individual interest.

The incremental derivation of various analyzers in the analyzer hierarchy has created data-driven support for a highly customized action item that can be implemented efficiently by an operations center worker. The recommended action is based at least in part on the correlated metrics that identified the event, and can also be aware of environmental factors (like cost, availability, and even a probability of the situation being isolated or rapidly expanding to other similar systems). This level of detailed analysis can relieve operator pressure while quickly providing the operator an option that is recommended to fix the given issue. In some cases, multiple recommendations can be given, if there are multiple other important issues happening at the same time.

FIG. 1 is a flow chart illustrating decision flow for correlating derived metrics for system activity. In some embodiments the system can be viewed as operating using three phases, which can operate concurrently or sequentially depending on the embodiment. Metrics can be collected for use in an analysis that provides a basis for recommended actions to take for continued system operations. In a first phase, metric preparation can occur. In box 102, computing resources can track various metrics about their operation. In box 104, these metrics can be retrieved from the computing resources directly or logging resources assigned to store the metrics (such as through use of a data retrieval module). These metrics can be stored in a form convenient for the computing resource or logging resource. In box 106, the metrics can be translated from a stored form into a desired form using translation functions.

In a second phase, analysis of metrics can occur. In box 108, analysis of metrics received from computing resources can be performed, such as graphing CPU or memory usage over time. In box 110, derived metrics can be constructed based on outputs from analysis of other metrics, such as combining CPU usage over time with users to show demanding users. For example, the demanding user graph can then be further combined with an application process listing to show what applications were used by demanding users. These derived metrics can be used to provide context, a story and/or a support for identifying symptoms of problems. Analysis in box 110 can repeat by taking outputs of prior analysis as inputs in further derived analysis. In box 112, these symptoms can be identified based on the analysis in boxes 108 and 110.

In a third phase, a decision on a recommendation for fixing problems can be formed. In box 114, metrics (including, both raw and derived metrics) can be correlated to the identified symptoms (e.g., high CPU usage is correlated with use of a reporting application by a user). In box 116, the correlated metrics can be used to identify a problem root (e.g., the reporting application includes inefficient calculations). In box 118, the system can provide a recommendation (e.g., move the reporting application to a server with more CPU available when the identified user logs on).

Figure 2:
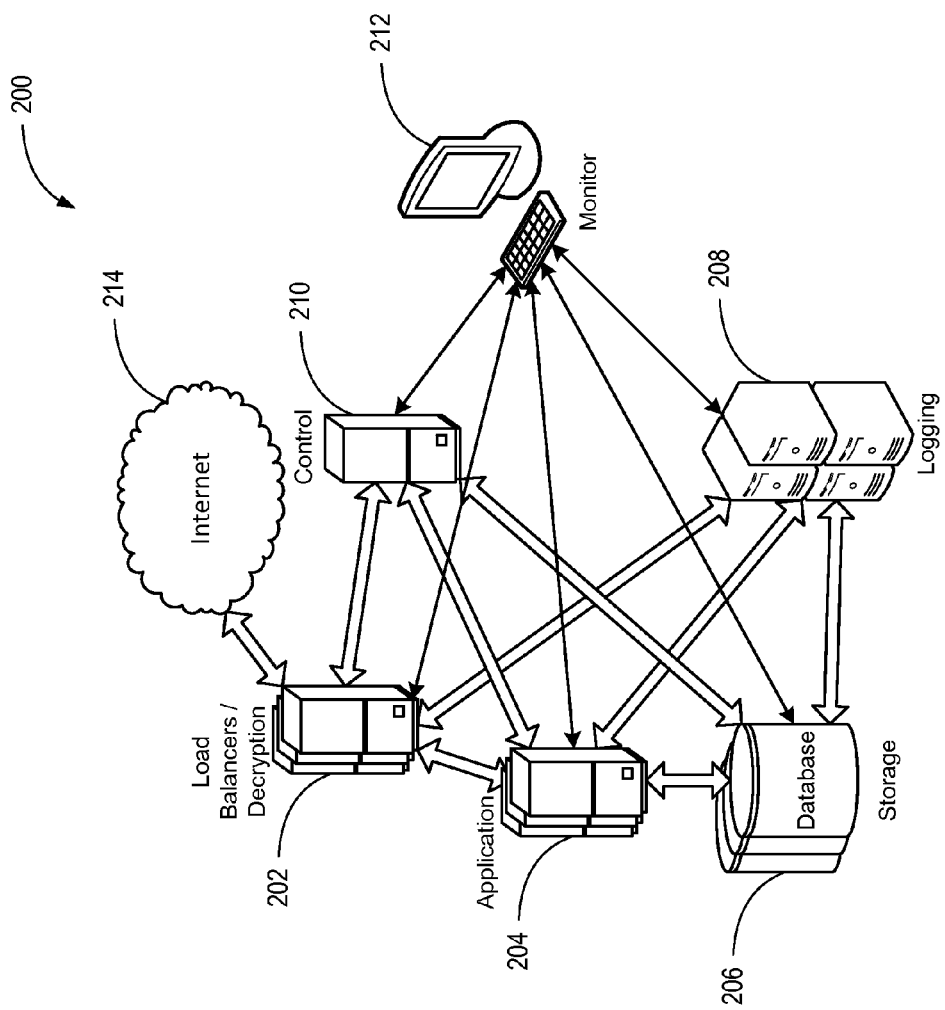
FIG. 2 is a schematic diagram illustrating a system for correlating derived metrics for system activity consistent with embodiments disclosed herein.

FIG. 2 is a schematic diagram illustrating a system for correlating derived metrics for system activity. Data center 200 can include a set of load balancers 202, application servers 204, storage servers 206, logging system 208, control system 210 and monitor system 212. Load balancers 202 can receive incoming requests from a network (such as Internet 214) and direct the requests to application servers 204 based on various criteria (load, query type, IP address, hops, etc.). In some embodiments, load balancer 202 can serve as an encryption endpoint with the client such that application servers 204 are able to function without encryption overhead.

Application servers 204 can provide platforms for application to execute, provide responses and receive requests. In some embodiments, application servers 204 can be client facing (i.e., receive and respond to requests from clients) and internal facing (i.e., receive and respond to requests from internal systems). Storage servers 206 can include databases, network attached storage, file servers, caches and/or other places for data to reside. Application servers 204 can use storage servers 206 to store and retrieve information.

Logging system 208 can provide storage, organization and/or retrieval services for metrics recorded by other computing resources. Use of logging system 208 can allow other systems (including load balancers 202, application servers 204 and/or storage servers 206) to offload the maintenance, storage and querying of metrics measured by the systems.

Control system 210 can manage and maintain computing resource pools. For example, control system 210 can provide more computing resources or retire computing resources based on expected and/or actual loads. Control system 210 can also manage backup, snapshotting, digital certificates, permissions and other management functions of systems within its authority.

Monitor system 212 can provide information to an administrator regarding system metrics. In some embodiments, a dashboard is presented to the administrator. During normal operation, a dashboard can show a set of metrics to the administrator. Some metrics can be displayed as graphs and can be color coded to identify low, medium and high resource usage (or more granularity of colors depending on system settings, e.g., a heat map) and/or low, medium and high importance (as related to one or more thresholds). Metrics can exist in a hierarchy. For example, lower hierarchy metrics can be based on measured values from computing resources. Metrics higher in the hierarchy can be derived from other metrics, which were in turn derived from other metrics. Some metrics can blend measured metric values with derived metric values. During alert operation, one or more symptoms (e.g., a metric that is out of expected threshold bounds) can be highlighted and other correlated metrics can be presented alongside the symptoms.

In one example, the process described in FIG. 1 can be applied to a system shown in FIG. 2. Data center 200 can include five systems that include load balancer 202, application server 204, database (represented by storage server 206), logging system 208 and control system 210. As in box 102, metrics can be collected by each of these systems. Load balancers 202 and application servers 204 can be configured to deposit recorded metrics with logging system 208. Storage servers 206 and control server 210 can store metrics locally.

An administrator can use a browser on a computer (e.g., monitor system 212) to request a web page at a URL. As in box 104, the browser can load fetching functions that request recorded metrics from logging system 208, storage servers 206 and control system 210. As in box 106, translation functions can translate the recorded metrics into raw metric data. As in box 108, analyzers implemented in conjunction with the web page can process the raw metric data and provide an output of metric data for rendering to a dashboard widget. As in box 110, analyzers implemented in conjunction with the web page can also process outputs of metric data from other analyzers to create derived metric data. As in box 112, analyzers can contain thresholds (or other detection measures) that indicate a metric is outside of expected values, which indicates a symptom of a problem. Analyzers can use a scoring system that increases an analyzer's output problem score based on a score received from an analyzer lower in the hierarchy (e.g., as part of the output of the lower analyzer) and on a problem rating internal to the analyzer (e.g., distance from an expected value or range).

Based on a detected symptom, a recommendation engine can determine a recommended action. As in box 114, a metric describing a symptom can be correlated with other metrics. Analyzers can use the scoring system and/or hierarchy of analyzers to determine correlated metrics. As in box 116, the recommendation engine can determine a root cause based on the correlated metrics and a database of proposed solutions. The recommendation engine can use distance information for each correlated metric to determine which problem (or solution) is a closest fit. As in box 118, the recommendation engine can determine a recommended action based on the selected problem.

The recommendation engine and analyzers can cause the outputs to be rendered to a dashboard on the web page. The recommendation engine can cause an alert to be rendered that highlights a determined symptom, correlated metrics and a proposed action to fix the determined problem. Other metrics can be displayed outside of the highlighted area for review by an administrator.

Figure 3:
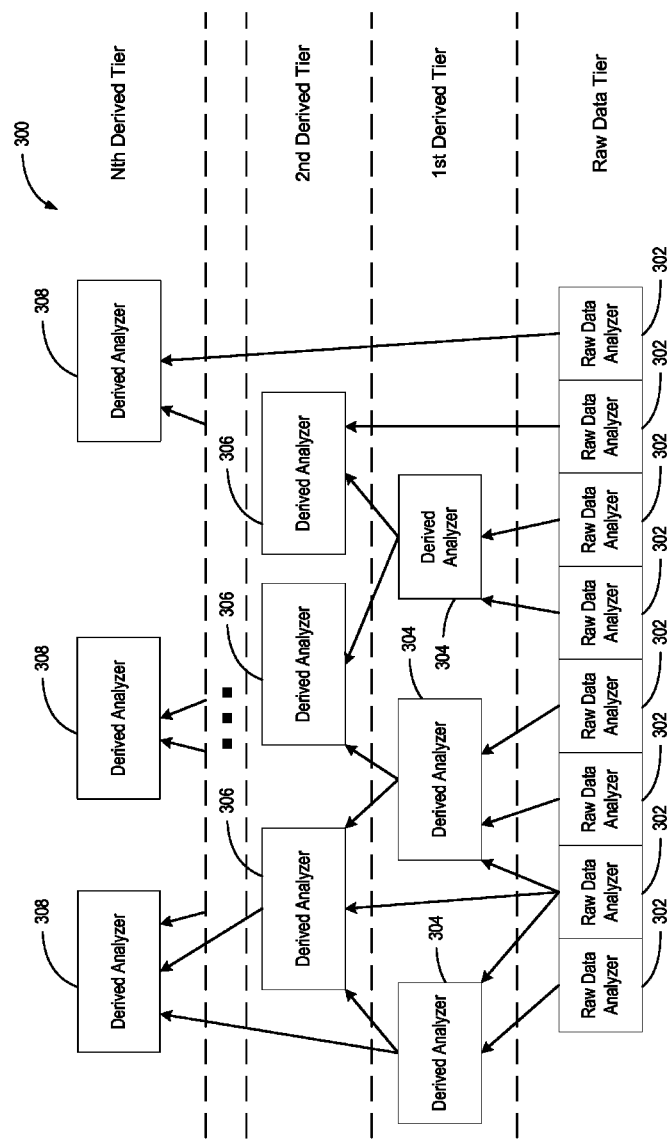
FIG. 3 is a diagram illustrating derivation of metrics consistent with embodiments disclosed herein.

FIG. 3 is a diagram illustrating derivation of metrics consistent with embodiments disclosed herein. Analyzers can be organized in a hierarchical structure in which analyzers in a higher tier use outputs of analyzers from a lower tier. In the example shown, raw data analyzers 302 in a lowest tier can analyze translated data from computing resources. First derived analyzers 304 can take output from one or more raw data analyzers 302 to compute derived metric data. Second derived analyzers 306 can take one or more inputs from first derived analyzers 304 alone or in combination with metric data from one or more raw data analyzers 302. This can repeat as needed (as shown by the ellipsis) to an Nth derived analyzer which takes one or more inputs from a prior tier alone or in combination with any lower-tier outputs. By organizing in a hierarchical structure, analyzers 302, 304, 306 and 308 can combine metric data to discover important information (trends, correlations, relationships, etc.).

Figure 4:
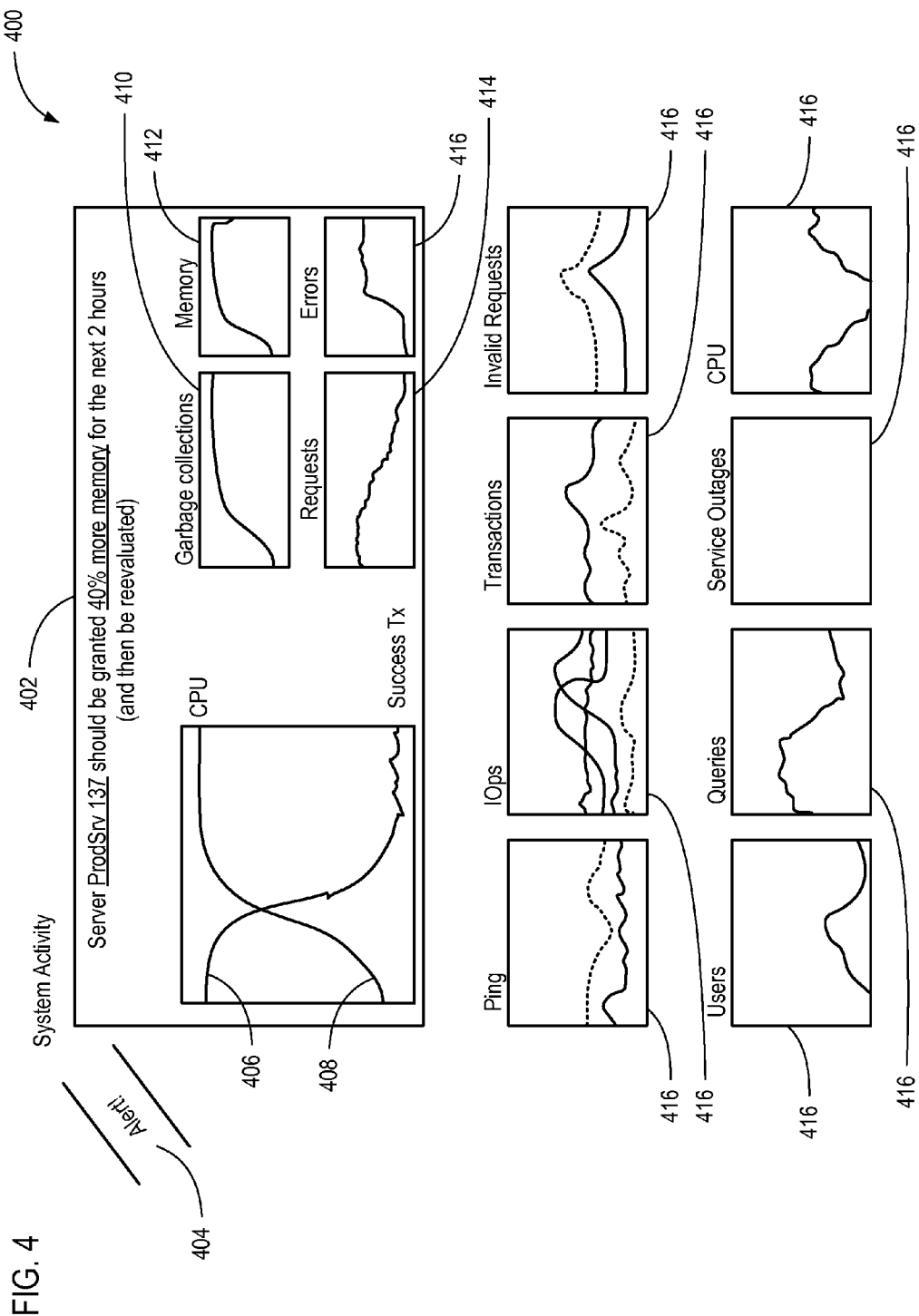
FIG. 4 is an illustration of a screenshot highlighting a problem with supporting data consistent with embodiments disclosed herein.

FIG. 4 is an illustration of screenshot 400 highlighting a problem with supporting data. After analysis, correlation and determination of a solution, the system can cause a dashboard to be rendered. When a problem is identified, alert 402 can be rendered in a way to highlight the alert information (e.g., rendering the problem a top 30% of a screen). Alert 402 can include symptom information 406 and 408 (such as graphs) and supporting metric information 410, 412, 414 and 416. Alert message 404 can also be rendered. A recommendation can be included, such as "Server ProdSrv 137 should be granted 40% more memory for the next 2 hours (and then be reevaluated)." Other metrics 416 can be shown away from the highlighted alert 402.

For example, in the embodiment shown, CPU usage symptoms have increased while a successful transmission symptom has decreased. Correlated metrics can include garbage collections, memory, requests fielded and a count of errors occurring. Based on these metrics, the recommendation engine matches the symptoms and correlated metrics with a recommendation of granting more memory for two hours to the affected server.

Figure 5:
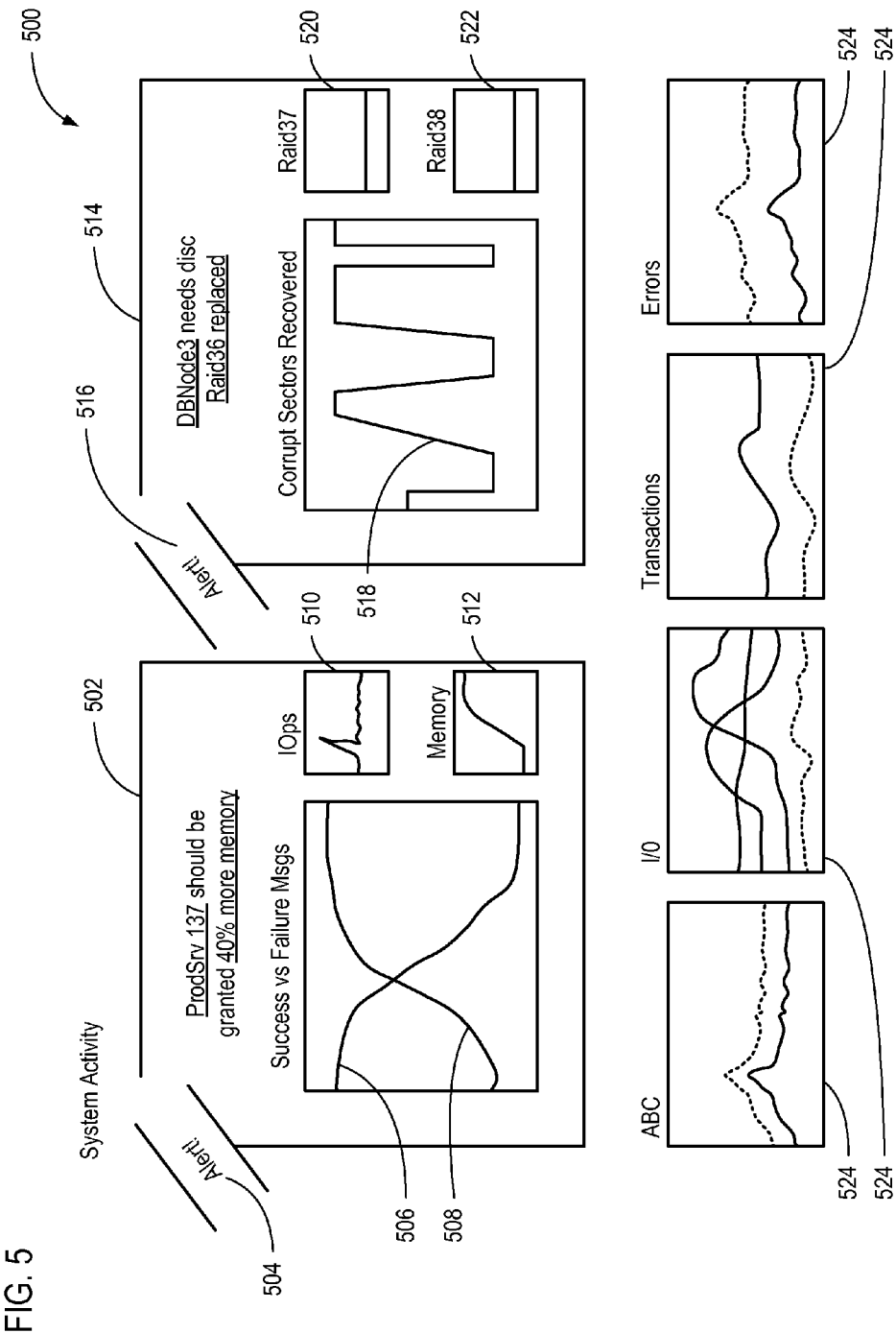
FIG. 5 is an illustration of a screenshot highlighting two problems with supporting data consistent with embodiments disclosed herein.

FIG. 5 is an illustration of screenshot 500 highlighting two problems with supporting data. In some cases, the system can identify multiple problems. In the embodiment shown, two problems are identified and share the highlighted screen area. After analysis, correlation and determination of a solution, the system can cause a dashboard to be rendered. When the first problem is identified, first alert 502 can be rendered in a way to highlight the alert information. First alert 502 can include symptom information 506 and 508 (such as graphs) and supporting metric information 510 and 512. Alert message 504 can also be rendered. A recommendation can be included, such as "ProdSrv 137 should be granted 40% more memory." Other metrics 524 can be shown away from the highlighted first alert 502.

When the second problem is identified, second alert 514 can be rendered in a way to highlight the alert information. Second alert 514 can include symptom information 518 and supporting metric information 520 and 522. Alert message 516 can also be rendered. A recommendation can be included, such as "DBNode3 needs disc Raid36 replaced." Other metrics 524 can be shown away from the highlighted second alert 514. By separating, correlating metrics and identifying individual problems, the system can save administrators time and reduce confusion about which metrics are proposed as related.

Figure 6:
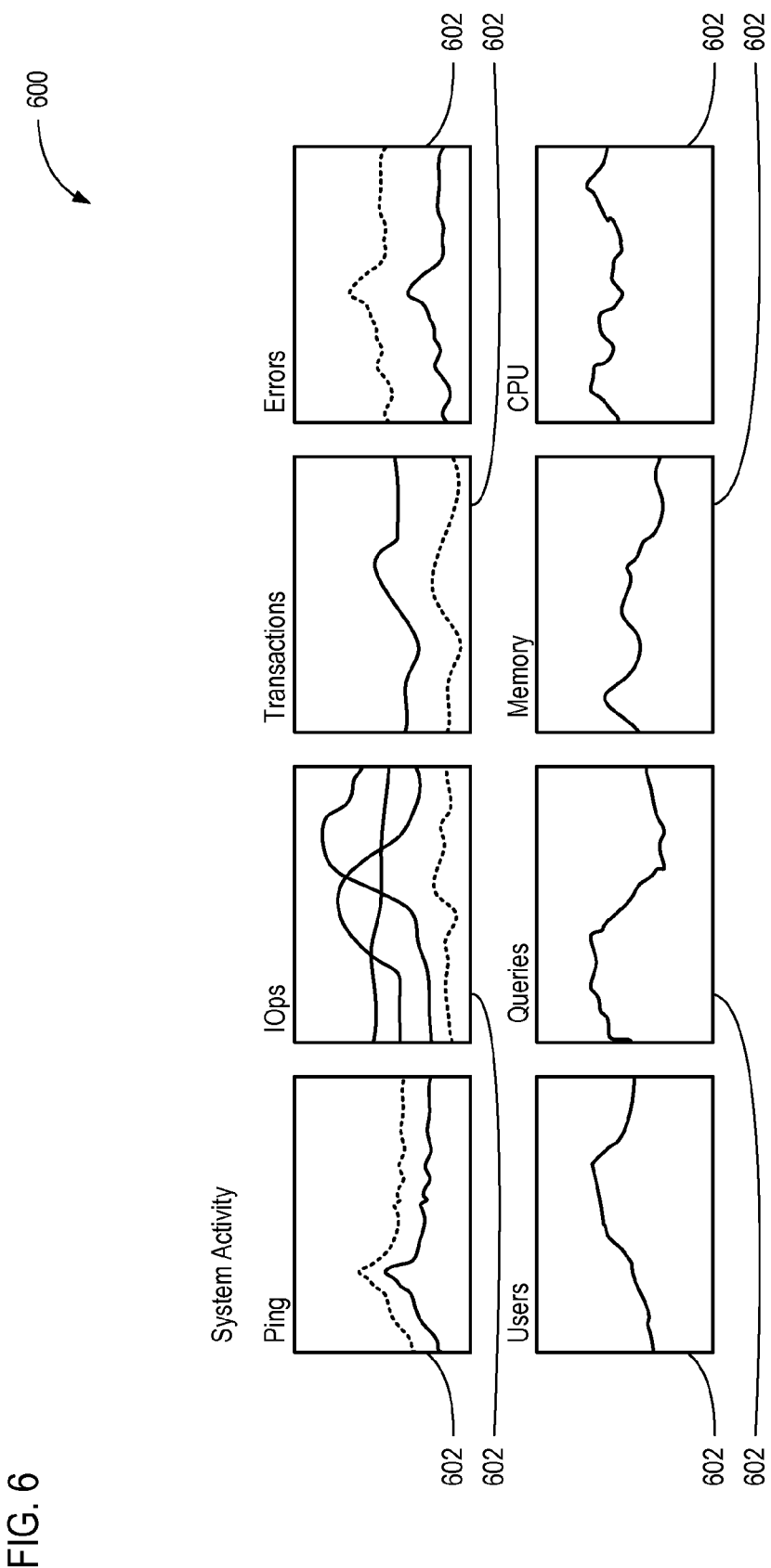
FIG. 6 is an illustration of a screenshot with no alerts showing supporting data consistent with embodiments disclosed herein.

FIG. 6 is an illustration of screenshot 600 with no alerts showing supporting data. When no problems are detected, analyzer data can be rendered to the screen. In the embodiment shown, analyzer data is rendered to individual graphs 602.

FIGS. 7 and 8 show examples of analyzers written in JavaScript™ scripting language. The analyzers can be loaded with a web page that provides a dashboard to an administrator. FIG. 7 shows a simple analyzer of a raw data tier (see also FIG. 3). FIG. 8 shows a more complex analyzer in a higher tier that derives results from four other analyzers (see also FIG. 3).

FIG. 7 is a snippet of code illustrating operation of a raw data analyzer. The analyzer first sets up a graphing strategy for rendering. The analyzer then extracts data from a dataset called "numSignificantExceptions." After extraction, the data is returned and the graph sent to rendering.

In some embodiments, the term "time slice" is the per minute segments shown on the graphs. The "extractor" function can be basic without having to handle how the values are aggregated and explained. The "merge strategy" is "add," such that "extracted" values will add together for a total within the time slice. This allows a total across the whole system to be shown, rather than an average as would be used for CPU or memory usage). Other values can include "average," "missing" (which highlights values that were present in some time slices, but missing in this one), "average adjusted by ratio" (e.g., heap, which enables use of explicit heap usage values, but the analyzer graph can be adjusted based on the max heap per system so that a 500 megabyte (Mb) usage from a 1000 Mb max shows as 50%, the same as a 2000 Mb usage from a 4000 Mb max system), and "global" (in which the values are not split by source system, but are treated as a single aggregate value). Custom merge strategies can also be used for more advanced comparisons.

FIG. 8 is a snippet of code illustrating operation of a derived data analyzer. In the embodiment shown, long running SQL statements are identified based on other analyzer output metrics. The inputs are from analyzers that include "all vs. long time analyzers," "all vs. long count analyzers," "all vs. long time values analyzers" and "all vs. long count values analyzers." The long running SQL requests are identified as a percentage of SQL execution time spent on the long running requests. Similar to FIG. 7, the code sets up the graphing of the data, merge strategy for use of the data and then extracts data from lower-tier analyzers.

Figure 9:
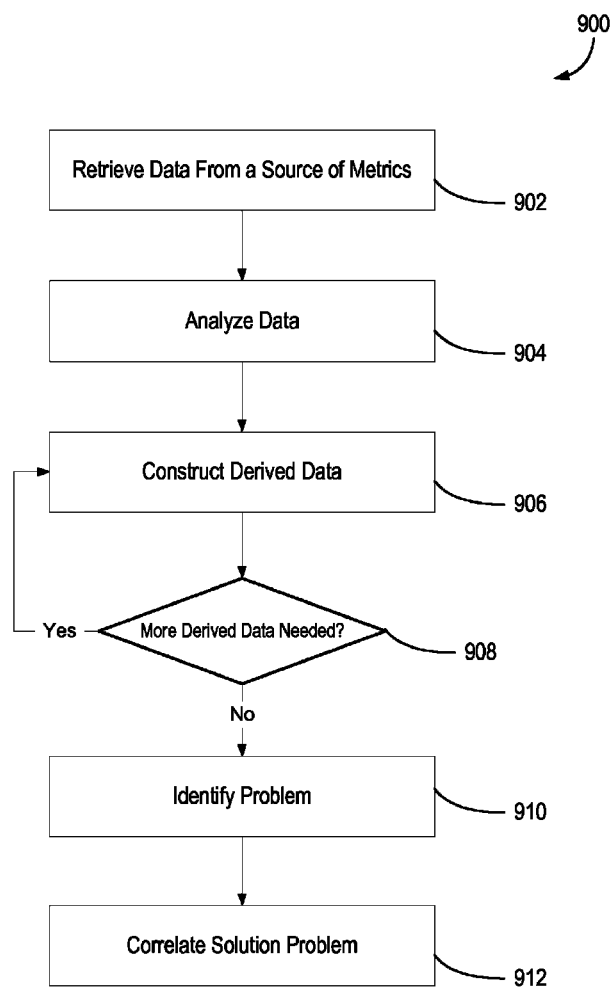
FIG. 9 is a flow chart illustrating a method for correlating derived metrics for system activity consistent with embodiments disclosed herein.
Figure 10:
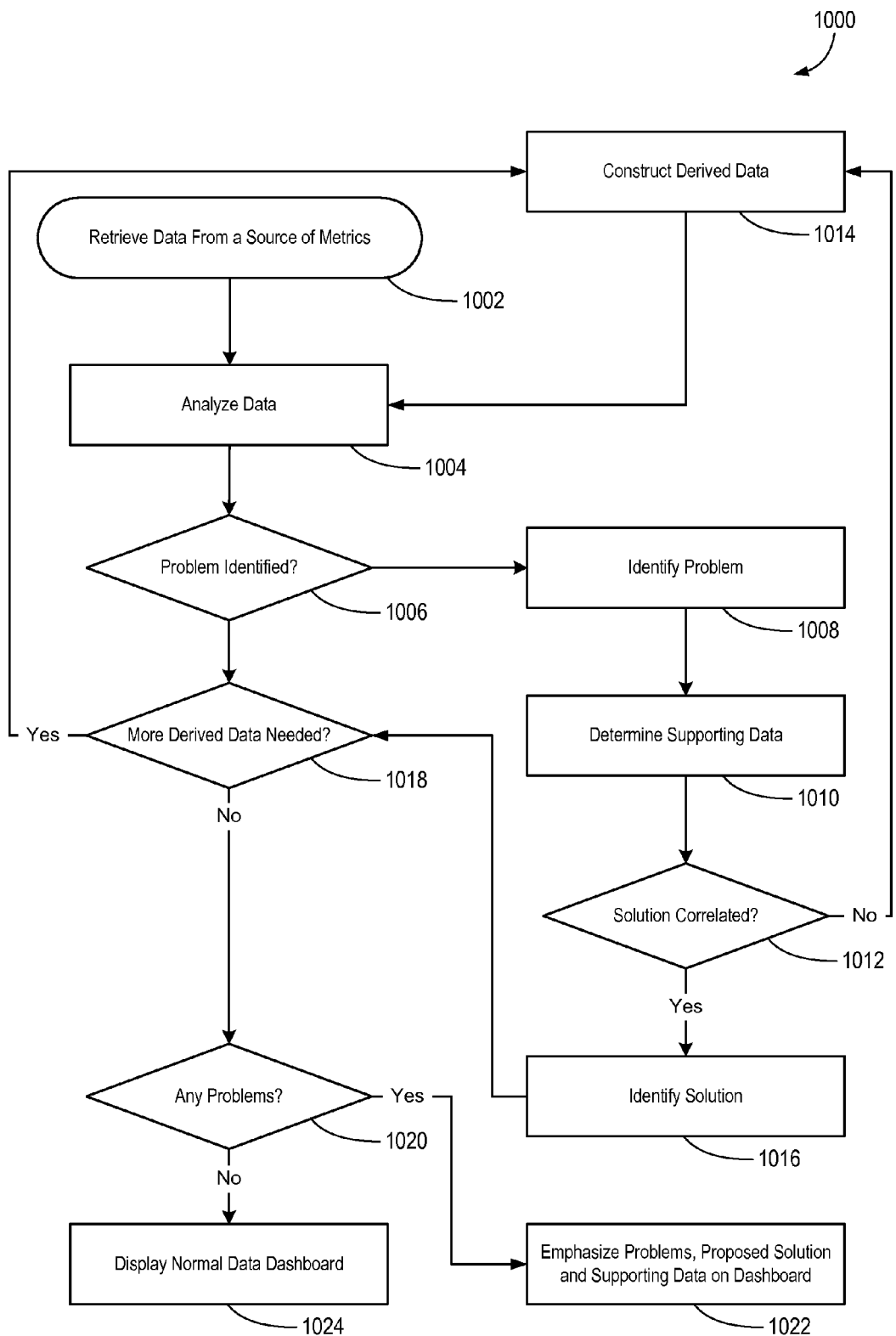
FIG. 10 is a flow chart illustrating an alternate method for correlating derived metrics for system activity consistent with embodiments disclosed herein.

FIGS. 9 and 10 describe embodiments of methods broken down into operations that can be used to analyze and derive metrics for discovery of symptoms, correlation of symptoms with other metrics and recommendation of actions to solve underlying problems evidenced by the symptoms. FIG. 9 describes a basic method of operation. FIG. 10 shows a more detailed method of operation. It should be recognized that the operations are shown in sequential order for simplifying understanding of the method. However, individual operations can be performed out of sequence, concurrently, in parallel, etc. in other embodiments.

FIG. 9 is a flow chart illustrating method 900 for correlating derived metrics for system activity. Method 900 can be accomplished by systems such as those shown in FIG. 2, including computing resources 202, 204, 206, 208 and 210 that provide metrics to monitor system 212. In block 902, data can be retrieved from a source of metrics such as those seen in FIG. 2. In block 904, the data can be analyzed and prepared for rendering to a dashboard for viewing by an administrator. In block 906, derived data can be constructed from analyzed data in block 904 or from data previously constructed in block 906 until no more derived data is needed in block 908. Using the analyzed data that includes derived data in block 910, a problem can be identified. In block 912, a solution can be correlated based on the problem and analyzed data.

FIG. 10 is a flow chart illustrating an alternate method 1000 for correlating derived metrics for system activity. Method 1000 can be accomplished by systems such as those shown in FIG. 2, including computing resources 202, 204, 206, 208 and 210 that provide metrics to monitor system 212. In block 1002, data is retrieved from a source of metrics such as databases, servers or other computing resources. In block 1004, the retrieved data is analyzed. If a problem is identified in block 1006, the problem is noted in block 1008 and supporting data 1010 is determined (such as by correlation). If a solution is not determined in block 1012, more derived data can be constructed in block 1014 and analyzed in block 1004, if available. Otherwise, a solution is identified in block 1016. If more derived data is needed and available in block 1018, then more derived data can be constructed in block 1014, which is analyzed in block 1004. If problems were discovered in block 1020, an alert dashboard that emphasizes problems, proposed solution and supporting data can be rendered in block 1022. If no problems were discovered, then a normal dashboard can be displayed in block 1024.

Figure 11:
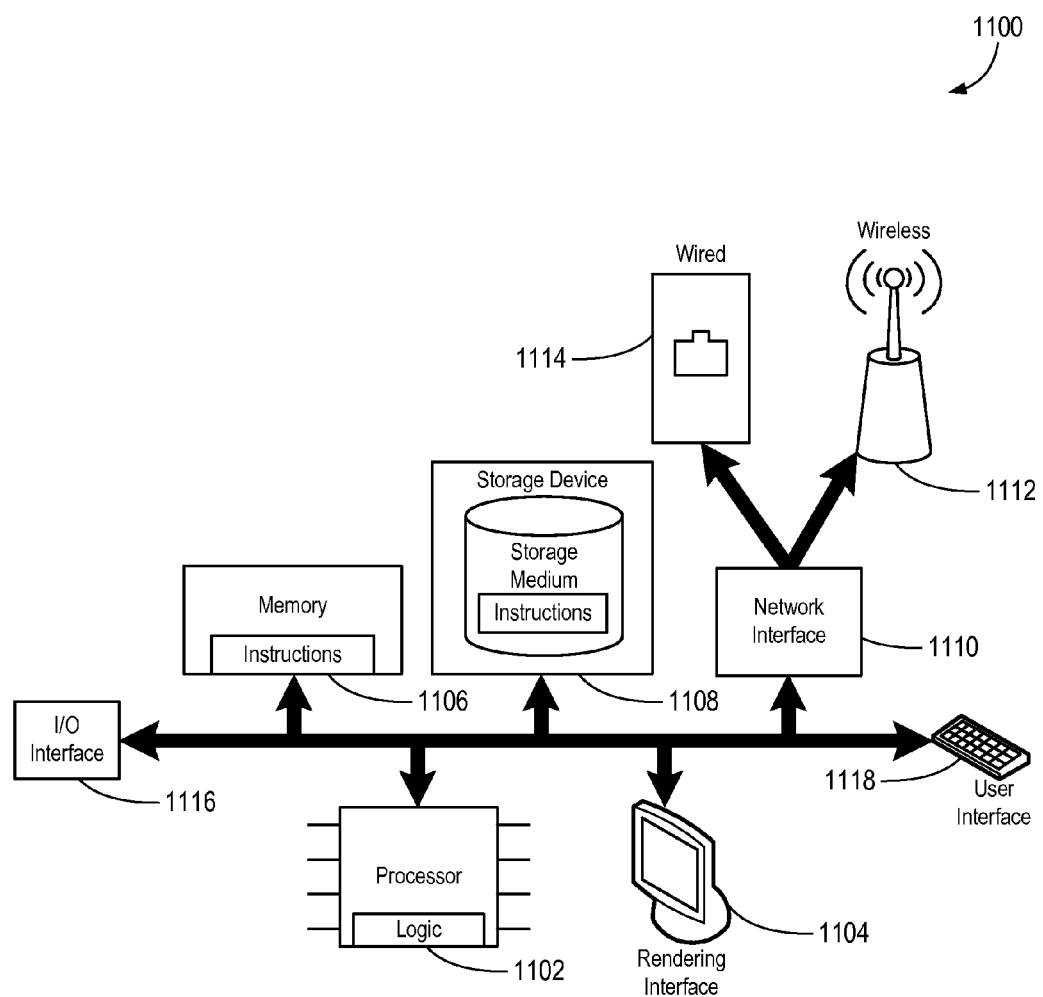
FIG. 11 is a schematic diagram of a computing system consistent with embodiments disclosed herein.

FIG. 11 is a schematic diagram of computing system 1100 consistent with embodiments disclosed herein. Computing system 1100 can be viewed as an information passing bus that connects various components. In the embodiment shown, computing system 1100 includes processor 1102 having logic 1102 for processing instructions. Instructions can be stored in and/or retrieved from memory 1106 and storage device 1108 that includes a computer-readable storage medium. Instructions and/or data can arrive from network interface 1110 that can include wired 1114 or wireless 1112 capabilities. Instructions and/or data can also come from I/O interface 1116 that can include such things as expansion cards, secondary buses (e.g., USB, etc.), devices, etc. A user can interact with computing system 1100 though user interface devices 1118 and rendering system 1104 that allows the computer to receive and provide feedback to the user.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A system for monitoring a data center comprising:
   a set of data center resources that provide one or more metrics about their operation;
   a hierarchy of analyzers configured to process an input of metric data and provide an output of metric data,
      wherein a first subset from a first level of the hierarchy of analyzers is configured to receive first metric data based on the one or more metrics,
      wherein a second subset from another level of the hierarchy of analyzers is configured to receive second metric data output from one or more analyzers from a lower level in the hierarchy of analyzers,
      wherein the hierarchy of analyzers further comprises at least three hierarchies, in which a first analyzer from a higher hierarchy takes at least one output from a second analyzer from a lower hierarchy;
      wherein correlating a fourth subset of the metric data with the third subset of metric data further comprises:
         scoring output from analyzers that perform the analyzing metric data; and
         combining scores from an analyzer in a lower level of the hierarchical structure with scores from an analyzer in a higher level of the hierarchical structure that receives the output of the analyzer in a lower level of the hierarchical structure;
   a monitoring system comprising:
      storage configured to store a set of recommended actions;
      an analyzer interface configured to receive at least some metric data from the hierarchy of analyzers;
      a rendering system interface configured to transmit problem information to the rendering system;

one or more processors configured to:
  detect a plurality of problems based at least in part on an output of an analyzer and determining a combined score exceeds a threshold;
  correlate a plurality of analyzer outputs and metrics based at least in part on a hierarchy of inputs to the analyzer; and
  determine a root cause of the plurality of problems;
  determine a recommended action based at least in part on the correlated analyzer outputs; and
a rendering system comprising:
  a monitoring system interface configured to receive the problem information from the monitoring system; and
  one or more processors configured to:
    ordering the plurality of problems by severity, selecting a most severe problem for primary emphasis and rendering the most severe alert in a primary location;
    transmit display information that highlights the identified plurality of problems, the output of the analyzer, the correlated analyzer outputs, the correlated metrics and the recommended action.

2. The system of claim 1, wherein the rendering system is further configured to render the plurality of problems, the correlated analyzer outputs and the recommended action together as an alert.

3. The system of claim 1, wherein the analyzers are independent modules that define the hierarchy based at least in part on each analyzer input.

4. A method of monitoring computing resources comprising:
  receiving one or more metrics describing operation of computing resources; processing the one or more metrics to prepare a first subset of a set of metric data;
  analyzing metric data from the set of metric data using a hierarchical structure to prepare derived metric data, the derived metric data being a second subset of the set of metric data, wherein, in the hierarchy, an output of derived metric data is used as an input to create further derived data, wherein the hierarchy further comprises at least three hierarchies, in which a first analyzer from a higher hierarchy takes at least one output from a second analyzer from a lower hierarchy;
  detecting a problem based at least in part on a third subset of the set of metric data; correlating a fourth subset of the metric data with the third subset of the set of metric data based at least in part on the hierarchy, wherein the correlating further comprises:
    scoring output from analyzers that perform the analyzing metric data; and combining scores from an analyzer in a lower level of the hierarchical structure with scores from an analyzer in a higher level of the hierarchical structure that receives the output of the analyzer in a lower level of the hierarchical structure;
  determining a root cause of the problem based at least in part on the problem, the hierarchy and the third subset of the set of metric data or the fourth subset of the set of metric data;
  determining a recommended action based at least in part on the third subset of the set of metric data or the fourth subset of the set of metric data; and
  providing an alert comprising the recommended action, the root cause of the problem, and correlated metric data including the third subset of the set of metric data and fourth subset of the set of metric data,
  wherein detecting a problem further comprises:
    detecting a plurality of problems;
    determining that a combined score exceeds a threshold;
  wherein providing an alert further comprises ordering alerts by severity, selecting a most severe alert for primary emphasis and rendering the most severe alert in a primary location.

5. The method of claim 4, wherein providing the alert further comprises rendering the third subset of metric data with emphasis over metric data that is not within the third subset of metric data.

6. The method of claim 4, further comprising scheduling analysis of derived metrics based at least in part on the detected problem.

7. The method of claim 4, wherein detecting a problem further comprises scoring output from analyzers providing the derived metric data and combining scores of correlated analyzers.

8. A nontransitory computer-readable medium storing instructions that when executed by a processor cause a computer system to perform a method for monitoring computing resources, the method comprising:
  layering an analysis of a set of metric data by using an output of a first analysis of a first subset of the set of metric data in an input of a second analysis of a second subset of the set of metric data, the set of metric data including original metric data and derived metric data and at least three layers of analysis;
  scoring output from analysis on the metric data;
  detecting a plurality of problems based at least in part on a third subset of the set of metric data, a combined score of a scored output from a lower analysis in a lower layer with a score from a higher analysis in a higher layer that receives the output of the lower analysis and the combined score exceeds a threshold;
  correlating a fourth subset of the set of metric data with the third subset of the set of metric data based at least in part on the hierarchy;
  determining a root cause of the plurality of problems based at least in part on the plurality of problems, the hierarchy and the third subset of the set of metric data or the fourth subset of the set of metric data;
  determining a recommended action based at least in part on the third subset of the set of metric data or the fourth subset of the set of metric data; and
  providing an alert with problems ordered by severity and a most severe alert with primary emphasis rendered in a primary location, the alert comprising the recommended action, the root cause of the plurality of problems, and correlated metric data including the third subset of the set of metric data and the fourth subset of the set of metric data.

9. The nontransitory computer-readable medium of claim 8, wherein correlating the fourth subset of the set of metric data with the third subset of set of metric data further comprises combining scores from an analyzer in a lower level of the at least three layers of analysis with an analyzer in a higher level of the at least three layers of analysis that receives the output of the analyzer in the lower level of the at least three layers of analysis.

10. The nontransitory computer-readable medium of claim 8, wherein providing an alert further comprises rendering the third subset of the set of metric data and fourth subset of the set of metric data together and visually separated from other metric data.

11. The nontransitory computer-readable medium of claim 8, wherein the recommended action is based at least in part on a combination of the third subset of the set of metric data and fourth subset of the set of metric data.

12. The nontransitory computer-readable medium of claim 8, wherein providing an alert further comprises:
- sending a text message;
- sending an email; or
- rendering an alert on a dashboard with the third subset of the set of metric data and fourth subset of the set of metric data having proximate, closer placement than metric data that is not within the first subset of the set of metric data.

\* \* \* \* \*